(12) United States Patent
Ikeda et al.

(10) Patent No.: US 12,506,146 B2
(45) Date of Patent: Dec. 23, 2025

(54) METHOD FOR PRODUCING LITHIUM-NICKEL COMPLEX OXIDE

(71) Applicant: SANYO Electric Co., Ltd., Kadoma (JP)

(72) Inventors: Tomoki Ikeda, Tokushima (JP); Yasunobu Kawamoto, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 475 days.

(21) Appl. No.: 18/027,797

(22) PCT Filed: Sep. 13, 2021

(86) PCT No.: PCT/JP2021/033483
§ 371 (c)(1),
(2) Date: Mar. 22, 2023

(87) PCT Pub. No.: WO2022/065096
PCT Pub. Date: Mar. 31, 2022

(65) Prior Publication Data
US 2023/0343953 A1 Oct. 26, 2023

(30) Foreign Application Priority Data
Sep. 25, 2020 (JP) ................................. 2020-160573

(51) Int. Cl.
*H01M 4/525* (2010.01)
*C01G 53/42* (2025.01)

(52) U.S. Cl.
CPC ............ *H01M 4/525* (2013.01); *C01G 53/42* (2013.01); *C01P 2002/52* (2013.01); *C01P 2006/40* (2013.01)

(58) Field of Classification Search
CPC .................................................... H01M 4/525
See application file for complete search history.

(56) References Cited

U.S. PATENT DOCUMENTS

| 6,077,496 A | 6/2000 | Ito et al. |
| 2013/0078520 A1 | 3/2013 | Toya et al. |

(Continued)

FOREIGN PATENT DOCUMENTS

| JP | H11-135118 A | 5/1999 |
| JP | 2010-024085 A | 2/2010 |

(Continued)

OTHER PUBLICATIONS

International Search Report dated Nov. 22, 2021, issued in counterpart International Application No. PCT/JP2021/033483.

*Primary Examiner* — William D Young
(74) *Attorney, Agent, or Firm* — WHDA, LLP

(57) ABSTRACT

A method for producing a lithium-nickel complex oxide according to an aspect of the present disclosure comprises: a filling step for filling a firing container with a Ni-containing metal compound and a Li compound to obtain a filling material including the Ni-containing metal compound and the Li compound; and a firing step for firing the filling material that fills the firing container, wherein, in the filling step, when the filling material that fills the firing container is divided into two equal parts in the height direction, the molar ratio A of Li to metals other than Li in the filling material in the upper half region and the molar ratio B of Li to metals other than Li in the filling material in the lower half region satisfy $1 < B/A < 1.15$.

3 Claims, 1 Drawing Sheet

(56) References Cited

U.S. PATENT DOCUMENTS

| | | |
|---|---|---|
| 2013/0288129 A1 | 10/2013 | Toya et al. |
| 2015/0188134 A1 | 7/2015 | Kameyama et al. |
| 2021/0119204 A1 | 4/2021 | Celasun et al. |
| 2022/0209231 A1* | 6/2022 | Kwak .................... H01M 4/62 |

FOREIGN PATENT DOCUMENTS

| | | | |
|---|---|---|---|
| JP | 2012-254889 A | 12/2012 | |
| JP | 5916876 B2 | 5/2016 | |
| JP | 2019-175701 A | 10/2019 | |
| KR | 10-2020-0106043 A | 9/2020 | |

* cited by examiner

METHOD FOR PRODUCING LITHIUM-NICKEL COMPLEX OXIDE

CROSS REFERENCE TO RELATED APPLICATIONS

This Application is the National Stage of International Application No. PCT/JP2021/033483, filed Sep. 13, 2021, which claims priority from Application No. 2020-160573 filed on Sep. 25, 2020 in Japan. The entire contents of these applications are incorporated herein by reference in their entirety.

TECHNICAL FIELD

The present disclosure relates to a method for manufacturing a lithium-nickel composite oxide.

BACKGROUND

Non-aqueous electrolyte secondary batteries typified by lithium ion secondary batteries have high energy density, and therefore have been already used as power sources for portable electronic devices. Furthermore, non-aqueous electrolyte secondary batteries have been studied and developed for use, not limited to the above-described use, as large power sources for hybrid vehicles, electric vehicles, and the like.

Lithium-nickel composite oxides used as a positive electrode active material of a non-aqueous electrolyte secondary battery have advantages that the capacity is higher than that of a lithium-cobalt composite oxide, which is mainly used currently, and that nickel as a raw material is less expensive than cobalt and is stably available, and thus lithium-nickel composite oxides are expected as a next-generation positive electrode material.

Examples of the method for manufacturing a lithium-nickel composite oxide include a method in which a firing container is filled with a powder of a precursor for a positive electrode material containing lithium and nickel and the powder is fired for a predetermined time under an oxygen atmosphere and an air atmosphere (for example, see Patent Literature 1).

CITATION LIST

Patent Literature

Patent Literature 1: JP 5916876 B

SUMMARY

Technical Problem

However, conventional methods for manufacturing a lithium-nickel composite oxide have a problem that thermal conduction during firing is so insufficient that a sufficient reaction does not proceed in the vicinity of the firing container bottom surface and thus the obtained lithium-nickel composite oxide has a large variation in crystallite size. If a lithium-nickel composite oxide having a large variation in crystallite size is used as a positive electrode active material, for example, the discharge rate characteristic of the non-aqueous electrolyte secondary battery may deteriorate, and therefore the methods for manufacturing are required to suppress a variation in crystallite size of a lithium-nickel composite oxide.

Therefore, an object of the present disclosure is to provide a method, for manufacturing a lithium-nickel composite oxide, in which a variation in crystallite size can be suppressed.

Solution to Problem

A method for manufacturing a lithium-nickel composite oxide according to an aspect of the present disclosure includes a filling step of filling a firing container with a Ni-containing metal compound and a Li compound to obtain a filling material including the Ni-containing metal compound and the Li compound and a firing step of firing the filling material filling the firing container, and in the filling step, the filling material filling the firing container has an upper half region and a lower half region that are equal in height, and a molar ratio A of Li to metals other than Li in the filling material in the upper half region and a molar ratio B of Li to metals other than Li in the filling material in the lower half region satisfy $1 < B/A < 1.15$.

Advantageous Effects of Invention

According to an aspect of the present disclosure, a lithium-nickel composite oxide is obtained in which a variation in crystallite size is suppressed.

DESCRIPTION OF EMBODIMENTS

Hereinafter, an example of an embodiment will be described in detail with reference to the drawings, but the drawings referred to in the description of an embodiment are schematically illustrated.

The method for manufacturing a lithium-nickel composite oxide of the present embodiment includes a filling step of filling a firing container with a Ni-containing metal compound and a Li compound to obtain a filling material including the Ni-containing metal compound and the Li compound and a firing step of firing the filling material that includes the Ni-containing metal compound and the Li compound and fills the firing container.

<Filling Step>

The Ni-containing metal compound to fill the firing container is not particularly limited as long as it is a Ni-containing compound, and may contain an element other than Ni. Examples of the element other than Ni include Co, Mn, Al, B, Mg, Ti, V, Cr, Fe, Cu, Zn, Ga, Sr, Zr, Nb, In, Sn, Ta, and W. Among them, at least one of Co, Mn, or Al is preferably contained. Examples of suitable compounds include metal compounds containing Ni, Co, and Mn, and metal compounds containing Ni, Co, and Al. The Ni-containing metal compound is, for example, in the form of a hydroxide, oxyhydroxide, or oxide. Among them, the forms of a hydroxide and an oxyhydroxide are preferable from the viewpoint of ease of combining Ni with another element, high reactivity with the Li compound, or the like. A Ni-containing metal hydroxide is obtained by a conventionally known method such as a crystallization method, a coprecipitation method, or a homogeneous precipitation method. A Ni-containing metal oxyhydroxide is obtained, for example, by adding an oxidizing agent such as sodium hypochlorite or hydrogen peroxide water to a Ni-containing metal hydroxide obtained by the above-described method. A Ni-containing metal oxide is obtained, for example, by firing a hydroxide or oxyhydroxide described above in a non-reducing atmosphere. The firing temperature is not particularly limited as long as a non-reducing atmosphere can be maintained, but for example, the firing temperature is preferably less than or equal to 850° C., and more preferably in the range of greater than or equal to 500° C. and less than or equal to 750° C.

Examples of the Li compound to fill the firing container include hydroxides, oxyhydroxides, oxides, carbonates, nitrates, and halides of lithium. These may be used singly or in combination of a plurality of kinds of them. Among them, hydroxides of lithium is preferable and lithium hydroxide is particularly preferable, from the viewpoints of a low melting point, high reactivity with the Ni-containing metal compound, and the like.

Figure 1:
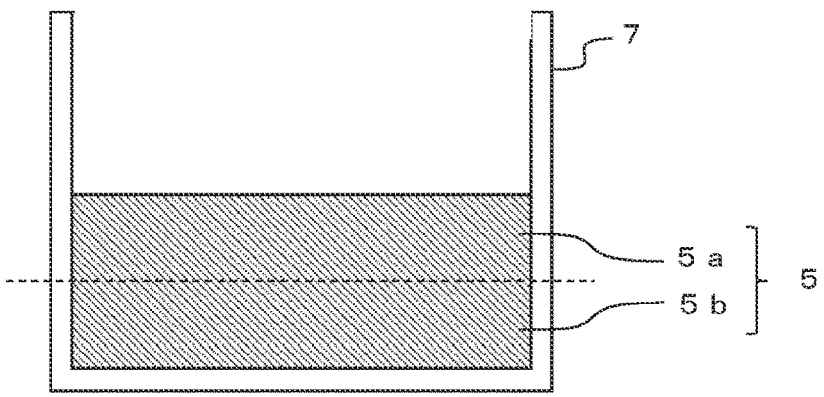
FIG. 1 is a schematic sectional view of a firing container filled with a Ni-containing metal compound and a Li compound.

FIG. 1 is a schematic sectional view of a firing container filled with the Ni-containing metal compound and the Li compound. In the filling step, a filling material 5 including the Ni-containing metal compound and the Li compound and filling a firing container 7 has an upper half region and a lower half region that are equal in height, and the molar ratio A of Li to metals other than Li in a filling material 5a in the upper half region and the molar ratio B of Li to metals other than Li in a filling material 5b in the lower half region satisfy 1<B/A<1.15. That is, the Ni-containing metal compound and the Li compound are to fill the firing container 7 so that the molar ratio A and the molar ratio B satisfy 1<B/A<1.15. Examples of the filling method satisfying the above range include a method in which the firing container 7 is filled from the bottom surface up to a predetermined height with a Li compound, and from the top surface of the Li compound filling the firing container 7, the firing container 7 is filled up to a predetermined height with a mixture of a Ni-containing metal compound and a Li compound. The Li compound to fill the firing container 7 first and the Li compound in the mixture to fill the firing container 7 subsequently may be the same compound or different compounds. In the case of using different compounds, the Li compound to fill the firing container 7 first preferably has a low melting point, and particularly preferably has a lower melting point than the Li compound in the mixture to fill the firing container 7 subsequently.

Alternatively, for example, the firing container 7 may be filled with a mixture of a Ni-containing metal compound and a Li compound so that the molar ratio of Li to metals other than Li increases stepwise from the top surface of the filling material 5 filling the firing container 7 toward the bottom surface. Specifically, the firing container 7 is filled from the bottom surface up to a predetermined height with a mixture A including a Ni-containing metal compound and a Li compound and having a high molar ratio of Li to metals other than Li, and from the top surface of the mixture A, the firing container 7 is filled up to a predetermined height with a mixture B including a Ni-containing metal compound and a Li compound and having a lower molar ratio of Li to metals other than Li than the mixture A. Furthermore, from the top surface of the mixture B, the firing container 7 is filled up to a predetermined height with a mixture C including a Ni-containing metal compound and a Li compound and having a lower molar ratio of Li to metals other than Li than the mixture B. Then, until the firing container 7 is filled with the filling material up to a predetermined height, filling the firing container 7 is continued with a mixture having a lower molar ratio of Li to metals other than Li than the mixtures already filling the firing container 7. The Li compounds in the mixtures may be the same compound or different compounds. In the case of using different compounds, the Li compound in the mixture to fill the firing container 7 first preferably has a low melting point, and particularly preferably has a lower melting point than the Li compound in the mixture to fill the firing container 7 subsequently. The above-described filling methods are examples, and the firing container 7 may be filled with the Ni-containing metal compound and the Li compound with any method as long as the molar ratio A and the molar ratio B satisfy 1<B<1.15.

The fact that the molar ratio A and the molar ratio B satisfy 1<B/A<1.15 means that the amount of the Li compound present in the filling material 5b in the lower half region is larger than the amount of the Li compound present in the filling material 5a in the upper half region. As described above, if a larger amount of the Li compound is present in the filling material 5b in the lower half region, the reactivity is improved in the vicinity of the bottom surface of the firing container 7 in the firing step described below, so that a lithium-nickel composite oxide is obtained in which a variation in crystallite size is suppressed. As a result, the discharge rate characteristic of the non-aqueous electrolyte secondary battery can be improved. If B/A is greater than or equal to 1.15, the amount of the Li compound present in the filling material 5b in the lower half region is too large, resulting in an increase in the amount of the unreacted Li compound, so that a variation in crystallite size cannot be sufficiently suppressed in the obtained lithium-nickel composite oxide.

The molar ratio A and the molar ratio B preferably satisfy 1.02≤B/A≤1.12, for example, from the viewpoints of further suppressing a variation in crystallite size, and the like.

The molar ratio of Li to metals other than Li, the molar ratio of Ni to metals other than Li, and the like in the entire filling material are appropriately set according to the intended composition of the lithium-nickel composite oxide. However, for example, from the viewpoints of thermal stability and the like, the molar ratio of Li to metals other than Li in the entire filling material is preferably greater than or equal to 0.95 and less than or equal to 1.10. Furthermore, for example, from the viewpoints of capacity and the like, the molar ratio of Ni to metals other than Li in the entire filling material is preferably greater than or equal to 0.65 and less than or equal to 1.00.

As the firing container 7 in an industrial production process, for example, a container having an inner dimension in the range of 100 mm (L)×100 mm (W)×20 mm (H) to 500 mm (L)×500 mm (W)×100 mm (H) is used. Then, the firing container 7 is filled with a raw material so that the filling material 5, as the raw material, including the Li compound and the Ni-containing metal compound has a height, for example, in the range of greater than or equal to 5 and less than or equal to 100 mm.

<Firing Step>

The filling material 5 is fired that includes the Ni-containing metal compound and the Li compound and fills the firing container 7, The firing conditions are appropriately set in consideration of the reactivity between the Li compound and the Ni-containing metal compound, and examples of the firing include one-step firing in which firing is performed in the range of greater than or equal to 650 and less than or equal to 850° C. for a predetermined time under an oxygen atmosphere and two-step firing in which firing is performed in the range of greater than or equal to 400 and less than or equal to 600° C. for a predetermined time and subsequently performed in the range of greater than or equal to 650 and less than or equal to 850° C. for a predetermined time under an oxygen atmosphere.

The apparatus used for firing the filling material 5 filling the firing container 7 is not particularly limited, and for example, a firing furnace such as an electric furnace, a kiln, a tubular furnace, or a pusher furnace can be used.

The filling material (fired material) after firing is washed to remove impurities or pulverized to control the particle size to a predetermined particle size as necessary.

According to the method for manufacturing of the present embodiment, a lithium-nickel composite oxide is obtained in which a variation in crystallite size is suppressed. The composition of the lithium-nickel composite oxide can be changed by adjusting the amount of the raw material to be put into the container, and a composite oxide represented by the following composition formula (1) is preferably prepared, for example, from the viewpoints of increasing the capacity of the non-aqueous electrolyte secondary battery, and the like.

Composition formula (1): $Li_aNi_{1-b}M_bO_2$ (In the formula, M represents a metal element other than Ni, a satisfies $0.95 \le a \le 1.10$, and b satisfies $0.01 \le b \le 0.5$.)

Figure 2:
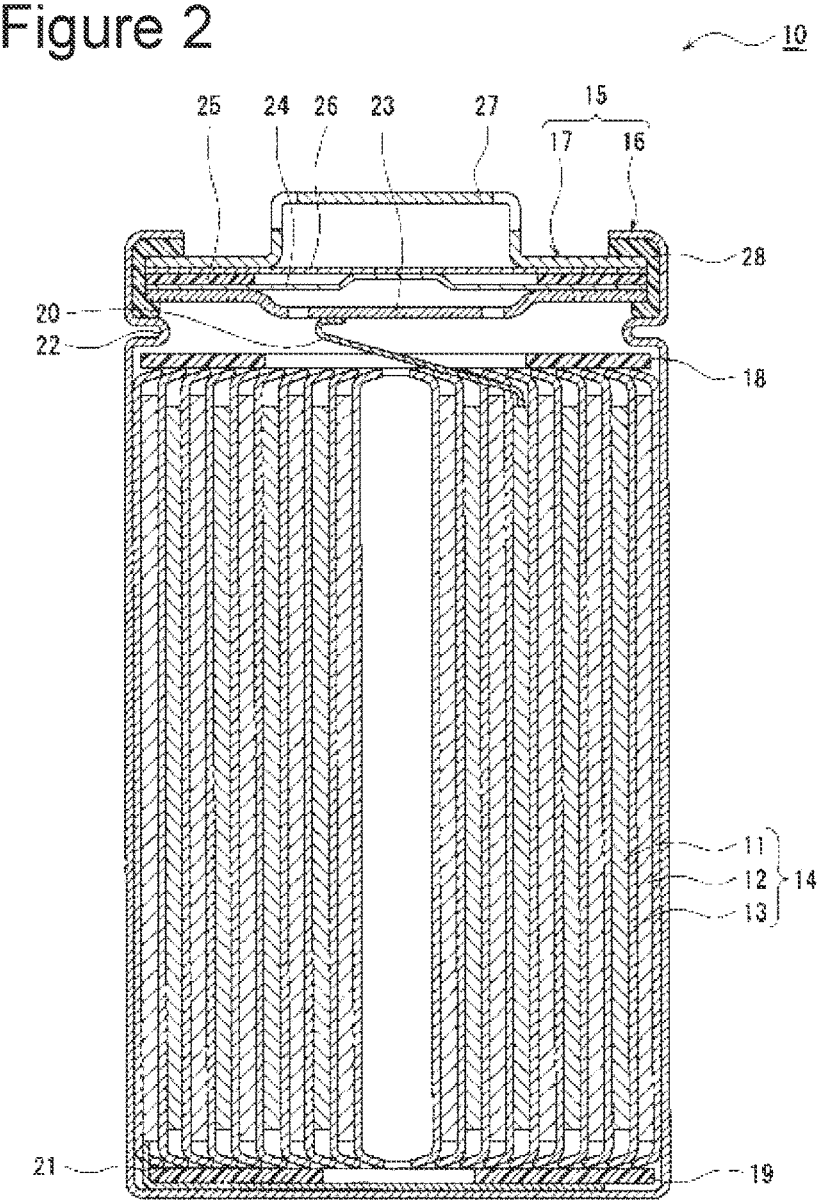
FIG. 2 is a sectional view of a non-aqueous electrolyte secondary battery of an example of an embodiment.

FIG. 2 is a sectional view of a non-aqueous electrolyte secondary battery of an example of an embodiment. A non-aqueous electrolyte secondary battery 10 shown in FIG. 2 includes a wound electrode assembly 14 in which a positive electrode 11 and a negative electrode 12 are wound with a separator 13 interposed therebetween, a non-aqueous electrolyte, insulating plates 18 and 19 disposed on the upper and lower sides of the electrode assembly 14 respectively, and a battery case 15 housing the above-described members. The battery case 15 includes a bottomed cylindrical case body 16 and a sealing assembly 17 that seals an opening of the case body 16. Instead of the wound electrode assembly 14, an electrode assembly having another form, such as a stacked electrode assembly in which positive electrodes and negative electrodes are alternately stacked with separators interposed therebetween, may be applied. Examples of the battery case 15 include metallic exterior cans having a cylindrical shape, a square shape, a coin shape, a button shape, or the like, and pouch exterior bodies formed by lamination with a resin sheet and a metal sheet.

The case body 16 is, for example, a bottomed cylindrical metallic exterior can. A gasket 28 is provided between the case body 16 and the sealing assembly 17 to ensure the sealability inside the battery. The case body 16 has a protrusion 22 in which, for example, a part of the side part of the case body 16 protrudes inward to support the sealing assembly 17. The protrusion 22 is preferably formed in an annular shape along the circumferential direction of the case body 16, and supports the sealing assembly 17 on its upper surface.

The sealing assembly 17 has a structure in which a filter 23, a lower vent member 24, an insulating member 25, an upper vent member 26, and a cap 27 are stacked in this order from the electrode assembly 14 side. Each member included in the sealing assembly 17 has, for example, a disk shape or a ring shape, and the members excluding the insulating member 25 are electrically connected to each other. The lower vent member 24 and the upper vent member 26 are connected to each other at their central parts, and the insulating member 25 is interposed between the circumferential parts of the lower vent member 24 and the upper vent member 26. When the internal pressure of the non-aqueous electrolyte secondary battery 10 increases due to heat generated by an internal short circuit or the like, for example, the lower vent member 24 deforms so as to push the upper vent member 26 up toward the cap 27 side and breaks, and thus the current pathway between the lower vent member 24 and the upper vent member 26 is cut off. When the internal pressure further increases, the upper vent member 26 breaks, and gas is discharged from an opening of the cap 27.

In the non-aqueous electrolyte secondary battery 10 shown in FIG. 2, a positive electrode lead 20 attached to the positive electrode 11 extends to the sealing assembly 17 side through a through hole of the insulating plate 18, and a negative electrode lead 21 attached to the negative electrode 12 extends to the bottom side of the case body 16 through the outside of the insulating plate 19. The positive electrode lead 20 is connected to the lower surface of the filter 23, which is the bottom plate of the sealing assembly 17, by welding or the like, and the cap 27, which is electrically connected to the filter 23 and is the top plate of the sealing assembly 17, serves as a positive electrode terminal. The negative electrode lead 21 is connected to the inner surface of the bottom of the case body 16 by welding or the like, and the case body 16 serves as a negative electrode terminal.

Hereinafter, each component of the non-aqueous electrolyte secondary battery 10 will be described in detail.

[Negative Electrode]

The negative electrode 12 includes, for example, a negative electrode current collector and a negative electrode active material layer provided on the negative electrode current collector.

As the negative electrode current collector, for example, a foil of a metal, such as copper, that is stable in a potential range of the negative electrode, or a film in which the metal is disposed on its surface layer is used.

The negative electrode active material layer includes a negative electrode active material. Furthermore, the negative electrode active material layer preferably includes a binder and the like. The negative electrode 12 can be produced by, for example, preparing a negative electrode mixture slurry including a negative electrode active material, a binder, and the like, applying the negative electrode mixture slurry to the negative electrode current collector, drying the applied slurry to form a negative electrode active material layer, and rolling the negative electrode active material layer.

The negative electrode active material is not particularly limited as long as it is a material capable of occluding and releasing lithium ions, and examples of the material include carbonaceous materials such as natural graphite and artificial graphite, elements such as silicon, titanium, germanium, tin, lead, zinc, magnesium, sodium, aluminum, potassium, and indium, alloys, and oxides.

Examples of the binder include fluorine-based resins, PAN, polyimide-based resins, acryl-based resins, polyolefin-based resins, styrene-butadiene rubber (SBR), nitrile-butadiene rubber (NBR), carboxymethyl celluloses (CMCs) and salts thereof, polyacrylic acid (PAA) and its salts (such as PAA-Na and PAA-K, that may include partially neutralized salts), and polyvinyl alcohol (TVA). These may be used singly, or greater than or equal to two of them may be used in combination.

[Positive Electrode]

The positive electrode 11 includes, for example, a positive electrode current collector and a positive electrode active material layer formed on the positive electrode current collector. As the positive electrode current collector, a foil of a metal, such as aluminum, that is stable in a potential range of the positive electrode, a film in which the metal is disposed on its surface layer, or the like can be used. The positive electrode active material layer includes, for example, a positive electrode active material, a binder, a conductive agent, and the like.

The positive electrode 11 can be produced by, for example, applying a positive electrode mixture slurry including a positive electrode active material, a binder, a conductive agent, and the like to the positive electrode current collector, drying the applied slurry to form a positive electrode active material layer, and then rolling the positive electrode active material layer.

As the positive electrode active material, a lithium-nickel composite oxide is used that is obtained by the method of manufacturing of the present embodiment described above. A composite oxide other than the lithium-nickel composite oxide obtained by the method of manufacturing of the present embodiment may be included as long as the battery performance is not impaired. For example, a composite oxide containing no Ni may be included.

Examples of the conductive agent include carbon-based particles such as carbon black (CB), acetylene black (AB), Ketjenblack, and graphite. These may be used singly, or greater than or equal to two of them may be used in combination.

Examples of the binder include fluorine-based resins such as polytetrafluoroethylene (PTFE) and polyvinylidene fluoride (PVdF), polyacrylonitrile (PAN), polyimide-based resins, acryl-based resins, and polyolefin-based resins. These may be used singly, or greater than or equal to two of them may be used in combination.

[Non-Aqueous Electrolyte]

The non-aqueous electrolyte includes, for example, a non-aqueous solvent and an electrolyte salt dissolved in the non-aqueous solvent. The electrolyte is not limited to a liquid electrolyte, and may be a solid electrolyte in which a gel polymer or the like is used. Examples of a solvent that can be used as the non-aqueous solvent include esters, ethers, nitriles such as acetonitrile, amides such as dimethylformamide, and mixed solvents of greater than or equal to two of them. The non-aqueous solvent may contain a halogen-substituted product in which at least a part of hydrogen in a solvent described above is substituted with a halogen atom such as fluorine.

Examples of the esters include cyclic carbonic acid esters such as ethylene carbonate (EC), propylene carbonate (PC), and butylene carbonate, chain carbonic acid esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen-substituted product, an ester is preferably used such as a fluorinated cyclic carbonic acid ester such as fluoroethylene carbonate (FEC), a fluorinated chain carbonic acid ester, or a fluorinated chain carboxylic acid ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lower aliphatic lithium carboxylates, and borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of greater than or equal to 0}. These lithium salts may be used singly, or a plurality of kinds of them may be mixed and used. Among these lithium salts, $LiPF_6$ is preferably used from the viewpoints of ion conductivity, electrochemical stability, and the like. The concentration of the lithium salt is preferably greater than or equal to 0.8 and less than or equal to 1.8 mol in 1 L of the non-aqueous solvent.

[Separator]

As the separator 13, for example, a porous sheet having an ion permeation property and an insulation property is used. Specific examples of the porous sheet include fine porous thin films, woven fabrics, and nonwoven fabrics. As a material of the separator, olefin-based resins such as polyethylene and polypropylene, cellulose, and the like are suitable. The separator 13 may be a stacked body having a cellulose fiber layer and a thermoplastic resin fiber layer such as an olefin-based resin. The separator may be a multilayer separator including a polyethylene layer and a polypropylene layer, and a separator may be used that has a surface to which a material such as an aramid-based resin or a ceramic is applied.

EXAMPLES

Hereinafter, the present disclosure will be further described with reference to Examples, but the present disclosure is not limited to these Examples.

Example 1

[Production of Lithium-Nickel Composite Oxide]

Urea was added to a mixed solution in which nickel sulfate, cobalt sulfate, and aluminum nitrate were dissolved, and while the resulting solution was stirred, the solution temperature was adjusted to greater than or equal to 80 and less than or equal to 100° C. to control the crystal growth rate, and thus a precipitate was obtained. This precipitate is a Ni—Co—Al coprecipitation hydroxide ($Ni_{0.91}Co_{0.045}(OH)_2$) having an atomic ratio among Ni, Co, and Al of 0.91:0.045:0.045.

Next, the Ni—Co—Al coprecipitation hydroxide and lithium hydroxide monohydrate ($LiOH/H_2O$) were mixed to obtain a mixed powder M.

An alumina firing container was filled with lithium hydroxide monohydrate from the bottom surface and with the mixed powder M from the top surface of the lithium hydroxide monohydrate filling the firing container, and thus a filling material was formed in the firing container. The ratio between the lithium hydroxide monohydrate filling the firing container from the bottom surface and the mixed powder M filling the firing container from the top surface of the lithium hydroxide monohydrate was set to 5:100 in terms of mass.

In the filling material, which has an upper half region and a lower half region that are equal in height, the mixing ratio of the Ni—Co—Al coprecipitation hydroxide and lithium hydroxide monohydrate in the mixed powder M was adjusted so that the molar ratio A of Li to metals other than Li in the filling material in the upper half region was 1.173 and the molar ratio B of Li to metals other than Li in the filling material in the lower half region was 1.314. At this time, the value of molar ratio B/molar ratio A was 1.12.

The firing container containing the filling material was placed in an electric furnace, and firing was performed at a temperature of 750° C. for 15 hours under an oxygen atmosphere to obtain a lithium nickel composite oxide containing Co and Al (composition: $LiNi_{0.91}Co_{0.045}Al_{0.045}O_2$). This composite oxide was used as a positive electrode active material.

[Production of Positive Electrode]

The lithium-nickel composite oxide as a positive electrode active material, acetylene black as a conductive agent, and polyvinylidene fluoride (average molecular weight: 1.1 million) as a binder were mixed at a mass ratio of 98:1:1 to prepare a positive electrode mixture slurry having a solid content of 70%. This slurry was applied to both surfaces of an aluminum foil having a thickness of 15 μm, and the applied film was dried and then rolled with a roller to produce a positive electrode in which a positive electrode active material layer was formed on both surfaces of a positive electrode current collector.

[Production of Negative Electrode]

A mixture was prepared by mixing 95 parts by mass of graphite powder and 5 parts by mass of Si oxide, and this mixture was used as a negative electrode active material. A mixture was prepared by mixing 100 parts by mass of the negative electrode active material, 1 part by mass of carboxymethyl cellulose (CMC) as a binder, and an appropriate amount of water, and to this mixture, 1.2 parts by mass of styrene-butadiene rubber (SBR) and an appropriate amount of water were added to prepare a negative electrode mixture slurry. This slurry was applied to both surfaces of a copper foil having a thickness of 8 μm, and the applied film was dried and then rolled with a roller to produce a negative electrode in which a negative electrode active material layer was formed on both surfaces of a negative electrode current collector.

[Preparation of Non-Aqueous Electrolyte]

To 100 parts by mass of a mixed solvent including ethylene carbonate (EC) and dimethyl carbonate (DMC) (at a volume ratio of EC:DMC=1:3), 5 parts by mass of vinylene carbonate (VC) was added, and $LiPF_6$ was dissolved in the resulting solvent at a concentration of 1 mol/L to prepare a non-aqueous electrolyte.

[Production of Non-Aqueous Electrolyte Secondary Battery]

Leads were attached to the positive electrode and the negative electrode, respectively, and then the positive electrode and the negative electrode were wound with a separator in which an alumina particle layer of 3 μm was formed on a polyethylene film of 12 μm between the positive electrode and the negative electrode to produce a wound electrode assembly. The electrode assembly was inserted into a case body, and the negative electrode lead was welded to the bottom surface of the case body. Next, the positive electrode lead was welded to a sealing assembly. Thereafter, the non-aqueous electrolyte was injected into the case body, and then the open end of the case body was sealed with the sealing assembly via a gasket to obtain a non-aqueous electrolyte secondary battery. The non-aqueous electrolyte secondary battery has a battery capacity of 2500 mAh.

Example 2

A filling material was formed in a firing container with a ratio, between lithium hydroxide monohydrate filling the firing container from the bottom surface and the mixed powder M filling the firing container from the top surface of the lithium hydroxide monohydrate, set to 0.1:100 in terms of mass. In the filling material, which has an upper half region and a lower half region that are equal in height, the mixing ratio of the Ni—Co—Al coprecipitation hydroxide and lithium hydroxide monohydrate in the mixed powder M was adjusted so that the molar ratio A of Li to metals other than Li in the filling material in the upper half region was 1.230 and the molar ratio B of Li to metals other than Li in the filling material in the lower half region was 1.255. At this time, the value of molar ratio B/molar ratio A was 1.02. A non-aqueous electrolyte secondary battery was produced under the same conditions as in Example 1 except for the above-described difference.

Example 3

A filling material was formed in a firing container with a ratio, between lithium hydroxide monohydrate filling the firing container from the bottom surface and the mixed powder M filling the firing container from the top surface of the lithium hydroxide monohydrate, set to 0.01:100 in terms of mass. In the filling material, which has an upper half region and a lower half region that are equal in height, the mixing ratio of the Ni—Co—Al coprecipitation hydroxide and lithium hydroxide monohydrate in the mixed powder M was adjusted so that the molar ratio A of Li to metals other than Li in the filling material in the upper half region was 1.236 and the molar ratio B of Li to metals other than Li in the filling material in the lower half region was 1.248. At this time, the value of molar ratio B/molar ratio A was 1.01. A non-aqueous electrolyte secondary battery was produced under the same conditions as in Example 1 except for the above-described difference.

Comparative Example 1

A firing container was filled with only the mixed powder M, and thus a filling material was formed in the firing container. In the filling material, which has an upper half region and a lower half region that are equal in height, the mixing ratio of lithium hydroxide monohydrate to the Ni—Co—Al coprecipitation hydroxide in the mixed powder M was adjusted so that the molar ratio B of Li to metals other than Li in the filling material was 1.242 in each of the upper half region and the lower half region. At this time, the value of molar ratio B/molar ratio A was 1. A non-aqueous electrolyte secondary battery was produced under the same conditions as in Example 1 except for the above-described difference.

Comparative Example 2

A filling material was formed in a firing container with a ratio, between lithium hydroxide monohydrate filling the firing container from the bottom surface and the mixed powder M filling the firing container from the top surface of the lithium hydroxide monohydrate, set to 7:100 in terms of mass. In the filling material, which has an upper half region and a lower half region that are equal in height, the mixing ratio of the Ni—Co—Al coprecipitation hydroxide and lithium hydroxide monohydrate in the mixed powder M was adjusted so that the molar ratio A of Li to metals other than Li in the filling material in the upper half region was 1.160 and the molar ratio B of Li to metals other than Li in the filling material in the lower half region was 1.339. At this time, the value of molar ratio B/molar ratio A was 1.15. A non-aqueous electrolyte secondary battery was produced under the same conditions as in Example 1 except for the above-described difference.

[Measurement of Crystallite Size]

The lithium-nickel composite oxide obtained in each of Examples and Comparative Examples was collected from the vicinity of the top surface and the vicinity of the bottom surface of the firing container, and the crystallite size of each lithium-nickel composite oxide was measured. Here, the term "crystallite size" refers to the average size of crystallites, and the term "crystallite" refers to a region that can be regarded as a single crystal present in a primary particle. The crystallite size is determined by Rietveld analysis with DIFFRAC plus TOPAS from data measured with high accuracy using an X-ray diffractometer manufactured by Bruker AXS.

The crystallite size of the lithium-nickel composite oxide collected from the vicinity of the bottom surface of the firing container was subtracted from the crystallite size of the lithium-nickel composite oxide collected from the vicinity of the top surface of the firing container, and the variation in crystallite size was evaluated from the absolute value of the obtained difference in accordance with the following criteria.

A: greater than or equal to 0 nm and less than 15 nm

B: greater than or equal to 15 nm and less than 20 nm

C: greater than or equal to 20 nm

A variation within the criterion C is evaluated as poor, a variation within the criterion B is evaluated as good, and a variation within the criterion A is evaluated as further good.

[Discharge Rate Characteristic]

Each non-aqueous electrolyte secondary battery in Examples and Comparative Examples was charged at a constant current of 0.2 C until the voltage reached 4.2 V, and then charged at a constant voltage of 4.2 V until the current reached 0.02 C. Thereafter, the non-aqueous electrolyte secondary battery was discharged at a constant current of 0.2 C until the voltage reached 2.5 V, and the discharge capacity at 0.2 C was measured. Subsequently, the non-aqueous electrolyte secondary battery was charged at a constant current of 0.2 C until the voltage reached 4.2 V, and then charged at a constant voltage of 4.2 V until the current reached 0.02 C. Thereafter, the non-aqueous electrolyte secondary battery was discharged at a constant current of 1.0 C until the voltage reached 2.5 V, and the discharge capacity at 1.0 C was measured. The discharge rate characteristic was determined with the following formula.

Discharge rate characteristic=(discharge capacity at 0.2 C/discharge capacity at 1.0 C)×100

The determined discharge rate characteristic was evaluated in accordance with the following criteria.

A: greater than or equal to 98.5%

B: greater than or equal to 98.0% and less than 98.5%

C: less than 98.0%

A discharge rate characteristic within the criterion C is evaluated as poor, a discharge rate characteristic within the criterion B is evaluated as good, and a discharge rate characteristic within the criterion A is evaluated as further good.

Table 1 summarizes evaluation results of the variations in crystallite size and the discharge rate characteristics in Examples and Comparative Examples.

TABLE 1

|  | Example 1 | Example 2 | Example 3 | Comparative Example 1 | Comparative Example 2 |
|---|---|---|---|---|---|
| Molar ratio A in upper half region | 1.173 | 1.230 | 1.236 | 1.242 | 1.160 |
| Molar ratio B in lower half region | 1.314 | 1.255 | 1.248 | 1.242 | 1.339 |
| Molar ratio B/molar ratio A | 1.12 | 1.02 | 1.01 | 1 | 1.15 |
| Variation in crystallite size | A | A | B | C | C |
| Discharge rate characteristics | A | A | B | C | C |

In Examples 1 to 3 in which in the filling material filling the firing container and having an upper half region and a lower half region that were equal in height, the molar ratio A of Li to metals other than Li in the filling material in the upper half region and the molar ratio B of Li to metals other than Li in the filling material in the lower half region satisfied 1<B/A<1.15, the variations in crystallite size were suppressed and the discharge rate characteristics were improved as compared with Comparative Examples 1 and 2 in which the relation 1<B/A<1.15 was not satisfied. Among Examples 1 to 3, in Examples 1 and 2 in which the relation 1.02≤B/A≤1.12 was satisfied, the variations in crystallite size were suppressed and the discharge rate characteristics were improved as compared with Example 3 in which the relation 1.02≤B/A≤1.12 was not satisfied.

REFERENCE SIGNS LIST 5, 5a, 5b Filling material
7 Firing container
10 Non-aqueous electrolyte secondary battery
11 Positive electrode
12 Negative electrode
13 Separator
14 Electrode assembly
15 Battery case
16 Case body
17 Sealing assembly
18, 19 insulating plate
20 Positive electrode lead
21 Negative electrode lead
22 Protrusion
23 Filter
24 Lower vent member
25 Insulating member
26 Upper vent member
27 Cap
28 Gasket

The invention claimed is:

1. A method for manufacturing a lithium-nickel composite oxide, the method comprising:
 a filling step of filling a firing container with a Ni-containing metal compound and a Li compound to obtain a filling material including the Ni-containing metal compound and the Li compound; and
 a firing step of firing the filling material filling the firing container, wherein
 in the filling step, the filling material filling the firing container has an upper half region and a lower half region that are equal in height, and a molar ratio A of Li to metals other than Li in the filling material in the upper half region and a molar ratio B of Li to metals other than Li in the filling material in the lower half region satisfy $1 < B/A < 1.15$.

2. The method for manufacturing a lithium-nickel composite oxide according to claim 1, wherein the molar ratio A and the molar ratio B satisfy $1.02 \leq B/A \leq 1.12$.

3. The method for manufacturing a lithium-nickel composite oxide according to claim 1, wherein the Li compound contains lithium hydroxide.

* * * * *